(12) United States Patent
Frisby et al.

(10) Patent No.: US 7,660,070 B2
(45) Date of Patent: Feb. 9, 2010

(54) QUIET HIGH PERFORMANCE SEEK PROCEDURE FOR DISK DRIVES

(75) Inventors: Doug Frisby, Nederland, CO (US); Jim Hargarten, Lafayette, CO (US)

(73) Assignee: ESGW Holdings Limited, Tortola (VG)

( * ) Notice: Subject to any disclaimer, the term of this patent is extended or adjusted under 35 U.S.C. 154(b) by 374 days.

(21) Appl. No.: 11/715,861

(22) Filed: Mar. 8, 2007

(65) Prior Publication Data
US 2008/0218899 A1 Sep. 11, 2008

(51) Int. Cl.
G11B 5/55 (2006.01)
(52) U.S. Cl. .................... 360/78.07; 360/78.06
(58) Field of Classification Search .... 360/78.06–78.07
See application file for complete search history.

(56) References Cited

U.S. PATENT DOCUMENTS

| | | | |
|---|---|---|---|
| 5,254,920 A | 10/1993 | Agarwal et al. | |
| 5,291,110 A | 3/1994 | Andrews, Jr. et al. | |
| 5,396,379 A * | 3/1995 | Mayo | 360/78.07 |
| 5,406,535 A * | 4/1995 | Seo et al. | 360/78.06 |
| 5,760,992 A * | 6/1998 | Phan et al. | 360/78.07 |
| 5,936,792 A * | 8/1999 | Kobayashi et al. | 360/78.07 |
| 5,982,173 A | 11/1999 | Hagen | |
| 6,031,684 A * | 2/2000 | Gregg | 360/78.06 |
| 6,118,616 A * | 9/2000 | Jeong | 360/78.07 |
| 6,128,154 A * | 10/2000 | Bang | 360/78.06 |
| 6,140,791 A * | 10/2000 | Zhang | 318/632 |
| 6,153,997 A | 11/2000 | Kobayashi et al. | |
| 6,243,226 B1 * | 6/2001 | Jeong | 360/78.07 |
| 6,279,108 B1 | 8/2001 | Squires et al. | |
| 6,327,229 B1 | 12/2001 | Kawabe | |
| 6,414,827 B1 | 7/2002 | Young et al. | |
| 6,441,988 B2 | 8/2002 | Kang et al. | |
| 6,490,118 B1 | 12/2002 | Ell et al. | |
| 6,501,613 B1 | 12/2002 | Shih | |
| 6,510,019 B1 * | 1/2003 | DeRosa | 360/78.06 |
| 6,515,820 B1 | 2/2003 | Burton et al. | |
| 6,563,666 B1 | 5/2003 | LaPanse | |
| 6,744,590 B2 | 6/2004 | Chu et al. | |
| 6,801,384 B2 | 10/2004 | Chu et al. | |
| 6,995,944 B1 | 2/2006 | Takaishi et al. | |
| 7,289,290 B2 * | 10/2007 | Lee | 360/78.06 |
| 2005/0052781 A1 | 3/2005 | Park et al. | |

FOREIGN PATENT DOCUMENTS

WO PCT/US2008/003079    7/2008

* cited by examiner

Primary Examiner—Hoa T Nguyen
Assistant Examiner—James L Habermehl
(74) Attorney, Agent, or Firm—Saile Ackerman LLC; Stephen B. Ackerman

(57) ABSTRACT a seek procedure for a hard disk drive which provides a significant reduction in acoustic noise as well as high performance fast seek times is described. The seek procedure lowers the peak acceleration for short seeks and imparts a smooth transition from a sine seek to an exponential arrival at the target track. The seek procedure provides an error free feedforward signal derived from a single sine table. The procedure which contains a time domain sinusoid acceleration feedforward combined with a phase-plane trajectory controlled velocity which, near seek completion. The procedure is constructed so that the acceleration begins at zero and, in the fashion of a sine, increases to a maximum, decreases to a minimum and then increases again until a computed switchpoint is reached. The switchpoint is determined in-situ, to provide a smooth and continuous velocity transition from sinusoid to exponential. The velocity trajectory is computed from a look-up table. The procedure is implemented using conventional seek controller servo components and commercially available operation software.

9 Claims, 13 Drawing Sheets

QUIET HIGH PERFORMANCE SEEK PROCEDURE FOR DISK DRIVES

BACKGROUND OF THE INVENTION (1) Field of the Invention

The invention relates to the operational design of hard disk drives and more particularly, to an improved read/write seek procedure and associated components which provide good access times as well as reduced acoustic noise.

(2) Background of the Invention and Description of Previous Art

A disk drive is a data storage device that stores digital data onto concentric circular tracks defined on the surface of a data storage disk. Data is read from or written to a track of the disk using a transducer mounted on the tip of a head assembly of an actuator arm. The transducer comprises a read/write element. The element is held close to a desired track while the disk spins about its center at a substantially constant angular velocity. To properly locate the transducer near the desired track during a read or write operation, a closed-loop servo scheme is generally implemented to move the actuator arm. The servo scheme uses servo data read from the disk surface to align the transducer with the desired track.

In order to move the read/write head from over one track to over another, a controller sends a sequence of signals to a voice coil mounted within the field of a permanent magnet at the distal end of the actuator arm. The voice coil moves within the magnetic field according to the strength of the signal and thereby positions the read/write head at the other end of the actuator arm from one position to another over the tracks of the hard disk. The signals are derived from an procedure which is programmed into the controller and which optimizes the speed of the head for a smooth error free head travel. The procedure controls the speed of the read/write head from its starting location over an arbitrary track on the storage disk to its final position over a target track. The starting location is either over the track whereon the previous read/write operation was performed or at some other arbitrary or "parking" location. The path taken by the head is over an arc determined by the locus of the actuator arm to which the head is attached. Those skilled in the art are familiar with the operation of head controllers.

In order to move the head from its initial position to its target location as quickly as possible, the servo system must have instantaneous knowledge of the heads position, velocity, and acceleration and from this information, compute and dispatch incrementally forward looking values for these parameters to the actuator. This is accomplished by a feedforward control which causes the head to respond accordingly. The feedforward control is able to minimize tracking errors caused by known disturbances by compensating for them in advance. The process of directing the head from its starting location to its target location is referred to as a "seek" operation and the path by which the head travels is defined by a seek procedure.

Chu, et. Al., U.S. Pat. Nos. 6,801,384 B2 and 6,744,590 B2 describe the communication between a controller and a magnetic read/write transducer in detail wherein the path of the transducer is controlled by a sinusoidal seek procedure. In '590 the seek time is adjusted by observing the maximum velocity error of the previous seek. '384 includes all actuator electrical characteristics in setting the acceleration level. It is common practice to account for back emf in 'bang-bang' seeks. Both show a sine wave seek where position, velocity and acceleration are individually controlled in the time domain. Kobayashi, et. Al., U.S. Pat. No. 6,153,997 cites a seek procedure where the acceleration trajectory follows a trapezoidal/exponential function Squires, et. al., U.S. Pat. No. 6,279,108 B1 cites a long seek procedure which is typical of those presently in use. This method produces good access times but also unwanted acoustic noise. It would be desirable to significantly reduce the acoustic noise while still obtaining good access times. Burton, et. Al., U.S. Pat. No. 6,515,820 describes a sine seek procedure whereby the velocity of the seek starts at zero and accelerates, following a sine wave until an acceleration saturation occurs. The sine seek controller receives velocity information and dispatches velocity feedforward data. It also computes a position error and a switch point curve. The switch point curve is is computed as an offset to a demand velocity curve which is stored in memory. When the velocity crosses the switch point curve, the feedforward signal changes from acceleration to deceleration and the velocity decreases until the demand velocity curve is crossed and then decreases linearly, reaching zero when the desired read/write head is over the target track.

Generally, a seek procedure independent of time is superior, particularly when gain variations and/or nonlinearities are present. This is so because It is found that forcing acceleration, velocity and position to zero simultaneously at a specific time is more difficult than forcing these parameters to zero without a time constraint.

If a seek is off the prescribed trajectory, as it typically is, the loop self-corrects by adjusting the acceleration and driving the seek back onto the trajectory, independent of time. If the acceleration feedforward is too low, the seek just takes a little longer but acceleration, velocity, and PES (Position Error Signal) are all simultaneously driven toward zero.

SUMMARY OF THE INVENTION

It is an object of this invention to provide a seek procedure for a hard disk drive which provides high performance as well as a significant reduction in acoustic noise.

It is yet another object of this invention to provide a seek procedure for a hard disk drive having a time domain acceleration.

It is still another object of this invention to provide a seek procedure for a hard disk drive which lowers the peak acceleration for short seeks to impart a smooth transition to an exponential arrival.

It is yet another object of this invention to provide a seek procedure for a hard disk drive which lowers the peak acceleration for long seeks to limit peak velocity.

It is still another object of this invention to provide a sine seek procedure for a hard disk drive providing an error free feedforward signal derived from a single sine table.

It is yet another object of this invention to provide a method to implement the seek procedure described by this invention.

These objects are accomplished by a seek procedure which implements a time domain sinusoid acceleration feedforward component combined with a phase-plane controlled velocity trajectory which, near seek completion, switches to an exponential arrival trajectory.

The procedure is constructed so that the acceleration begins at zero and, in the fashion of a sine, increases to a maximum, decreases to a minimum and then increases again until a computed switchpoint is reached. The switchpoint is determined in-situ, to provide a smooth velocity transition from sinusoid to exponential. The velocity trajectory is computed from a normalized look-up table.

Matlab®[2] is used to model the drive and simulate the seek system. The procedure is implemented in C or assembly language and a microprocessor.

[2] Matlab is a registered trademark of The MathWorks, Inc., 3 Apple Hill Drive, Natick, Mass.

DESCRIPTION OF THE PREFERRED EMBODIMENT

Figure 11:
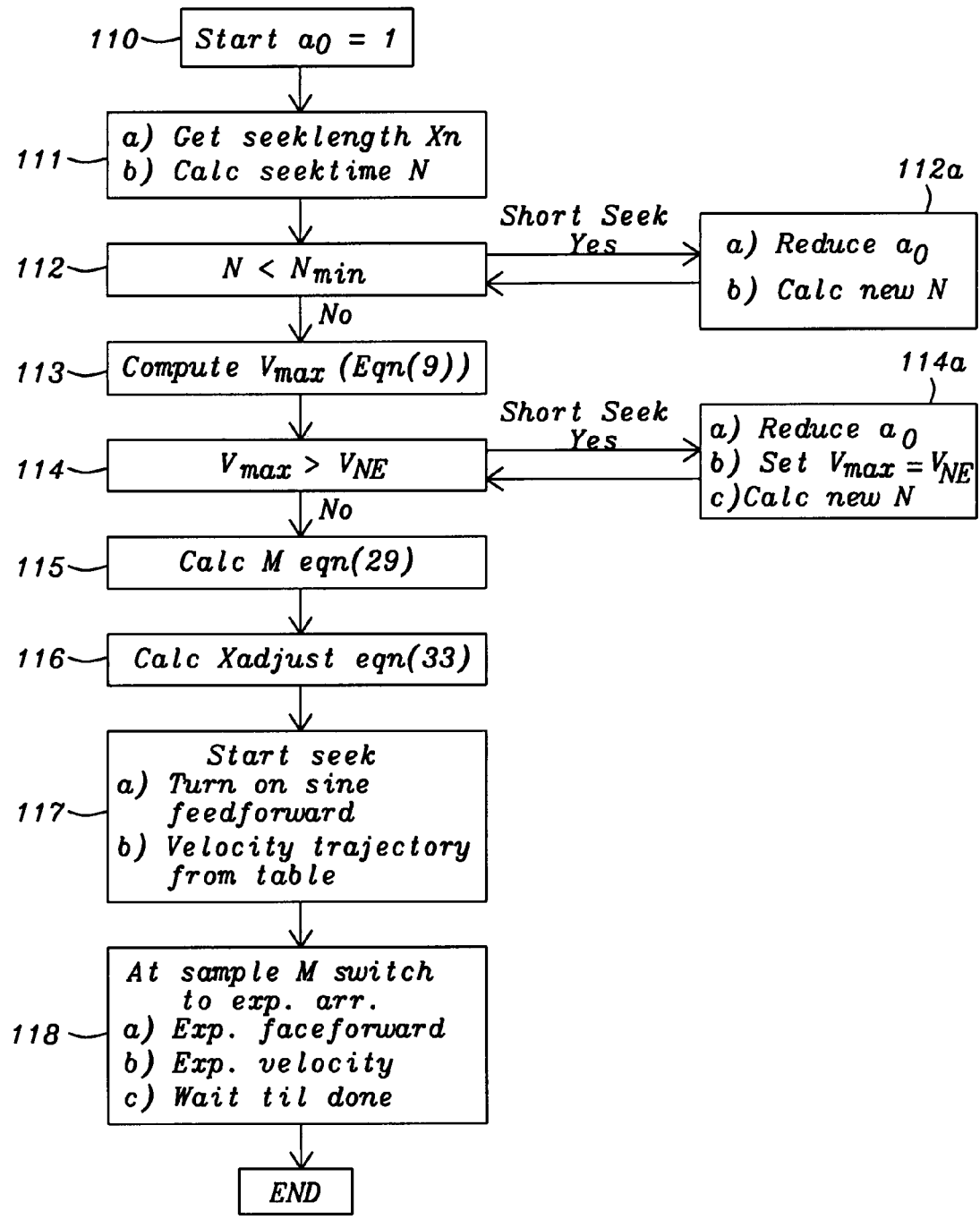
FIG. 11 is a flow chart illustrating the steps followed by the seek controller during the operation of the seek procedure disclosed by this invention.
Figure 12:
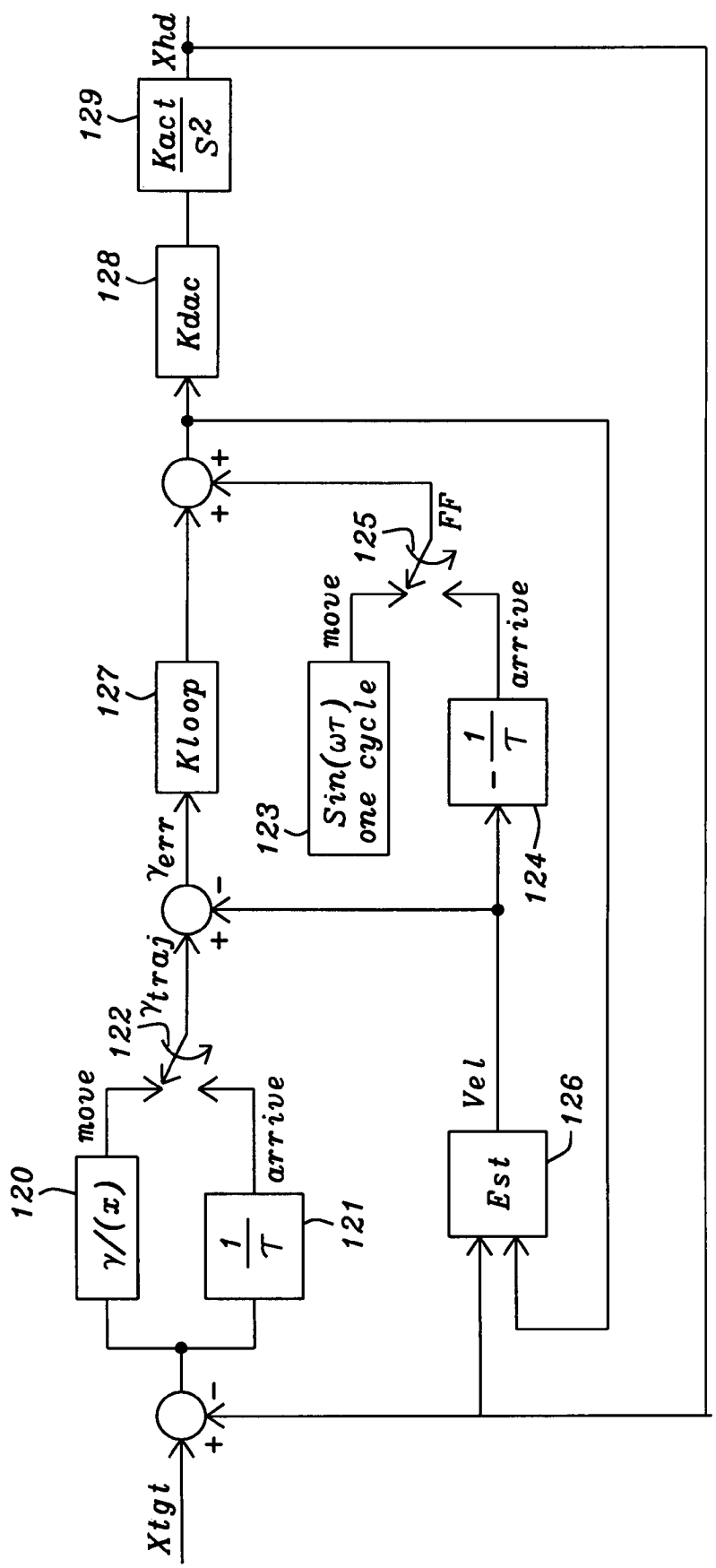
FIG. 12 is a block diagram illustrating the operational layout of an actuator seek controller for the performing s sine/exponential seek operation using the principles and methods outlined by this invention.

In an embodiment of this invention the quiet seek procedure of the invention is described and mathematically developed as an procedure with reference to a corresponding process flow illustrated by a flow chart in FIG. 11 and a block diagram in FIG. 12. In the first section, the sine portion of the procedure is described. The second section describes the exponential arrival and the third, the transition from the sine movement to the exponential movement.

Sine Seek Movement

The continuous time equations of motion for the read/write head during a seek operation are given as follows:

$$a = a_0 \sin(\omega t) \quad (1)$$

$$v = \frac{a_0}{\omega}(1 - \cos(\omega t)) \quad (2)$$

$$x = \frac{a_0}{\omega}\left(t - \frac{1}{\omega}\sin(\omega t)\right) \quad (3)$$

where $\alpha$ is the acceleration, v the velocity and x the position. $\omega t$ is a polar angle in radians wherein, when applied to a seek, $\omega$ is the reciprocal of the total time required to move the head from the starting position to the target track.

Figure 1:
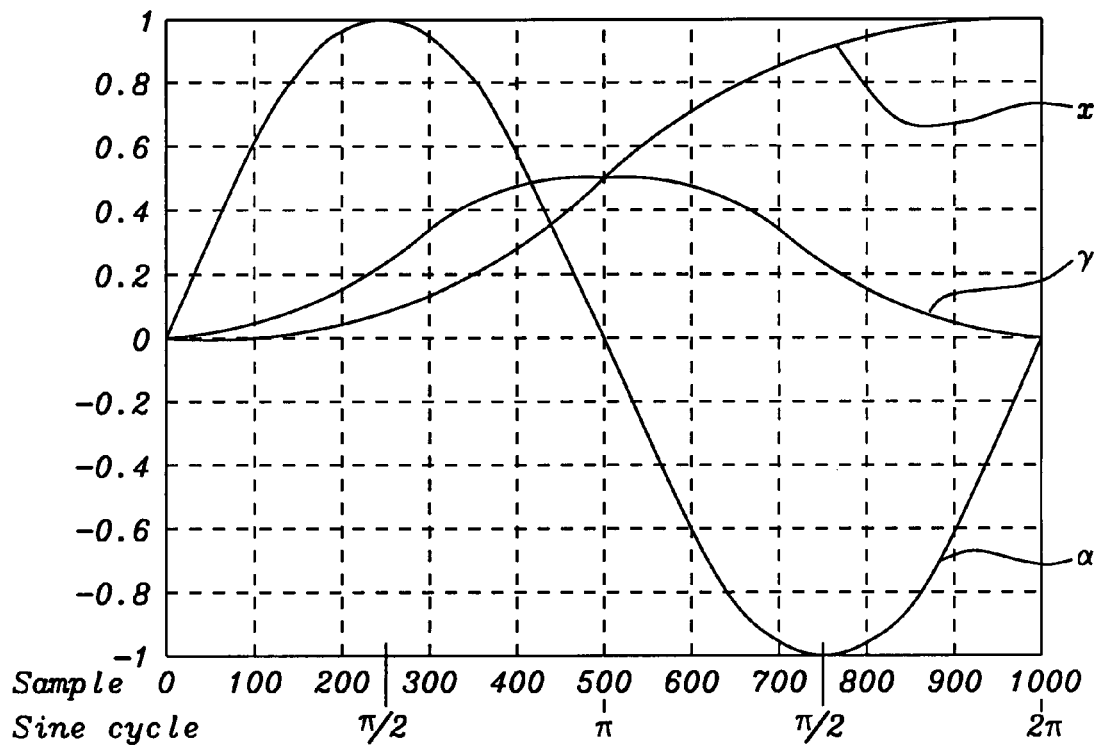
FIG. 1 is a normalized plot of the continuous time equations of motion use in the development of the sine seek procedure of this invention.

A normalized plot of these entities is shown in FIG. 1. Note that acceleration $\alpha$ is a sine, velocity v raised cosine and position x is a sine on a ramp. The plot in FIG. 1 is normalized to 1000 samplings from start of the seek to arrival at the target track. This spans a complete sine cycle from 0 to $2\pi$ radians.

A normalized acceleration feedforward equation (4) can be extracted from the equations of motion supra.

$$\frac{(v-0.25)^2}{0.25^2} + a^2 = 1 \quad (4)$$

Figure 2:
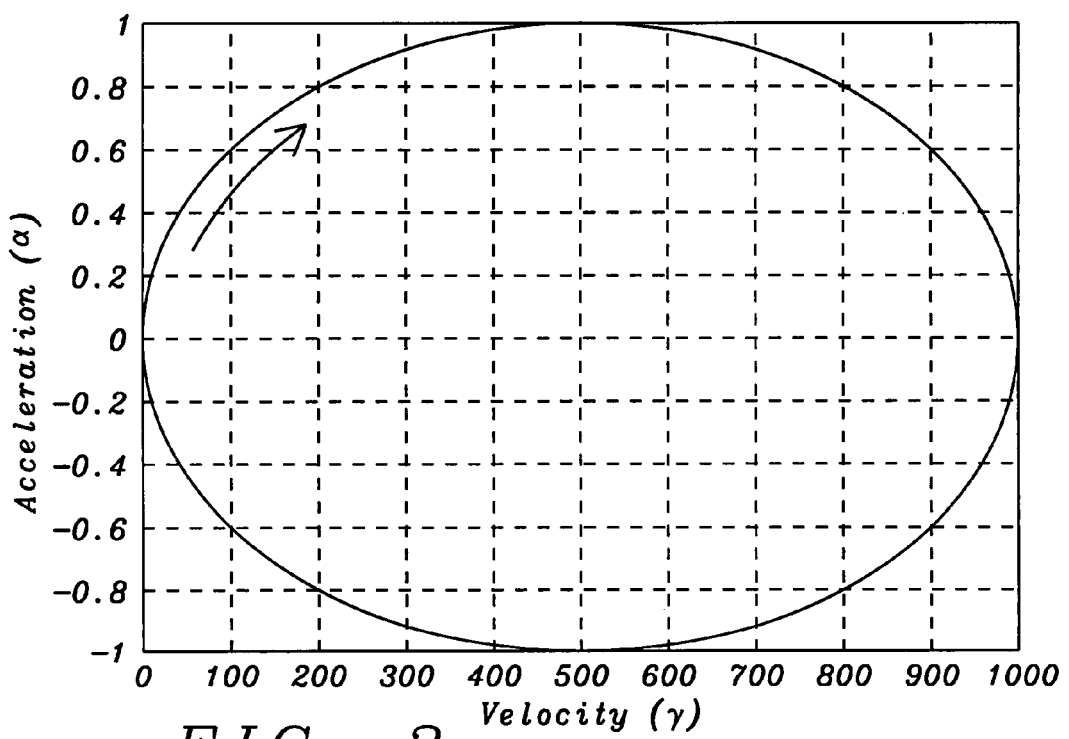
FIG. 2 is a plot of the normalized feedforward acceleration equation used in the development of the sine seek procedure of this invention.

This is an equation for an ellipse. A plot of normalized acceleration vs. velocity is shown In FIG. 2. The seek begins at the origin and travels one revolution clockwise (arrow) around the ellipse. To decouple acceleration from time the procedure would find the appropriate acceleration for a given velocity. At least two problems exist viz. 1) the origin is a stable location and the system would somehow have to be "started" and 2) for a given velocity, the polarity of the acceleration is not known. The system would know that if it had been accelerating, it probably still is, but at or near peak velocity the acceleration polarity is ambiguous. This means the feedforward needs to be time-based or tied to position.

Matlab® simulations of a position-based acceleration feedforward perform poorly. This 'forces' the acceleration feedforward to be time based.

Velocity Trajectory

A phase-plane velocity trajectory equation cannot be extracted from the equations of motion; the equations are transcendental. Matlab® can be used to obtain the data.

Figure 3:
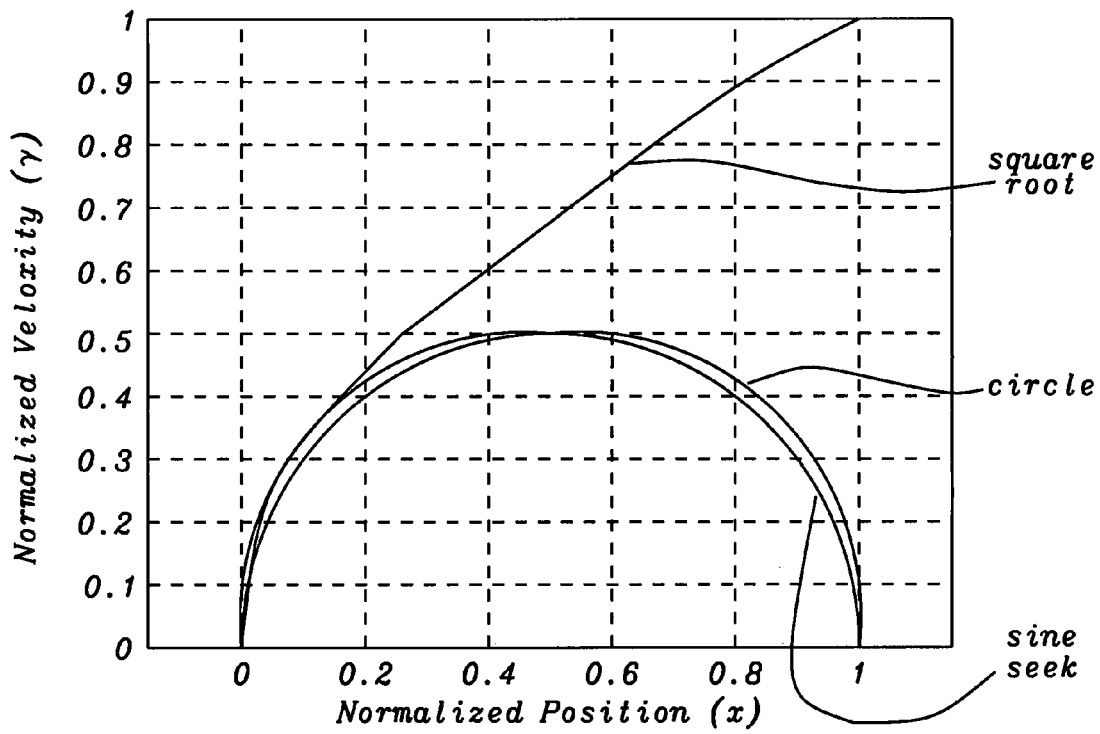
FIG. 3 is a plot comparing normalized velocity vs. position for a sine seek path to circular and square root paths.

FIG. 3 is a plot of velocity vs. position for a sine wave acceleration. Also shown are a circle and a square root velocity trajectory (commonly used in disk drive seek procedures). The circle is similar to the sine however Matlab® simulations show it's usage to be unacceptable. Since there is no equation for the velocity trajectory, a lookup table must be used to find the desired velocity as a function of position. In the block diagram (FIG. 12) this is noted as v(x).

Sampled Data Equations of Motion

In order to apply the equations of motion to an application wherein the time intervals are represented by an orderly set of successive time sampled data, such as the interchange of instructions and feedback between a moving read/write head of a disk drive and its controller, the time element $\omega t$ in the continuous equations is replaced with a normalized sample fraction. Substituting $$\omega t = \frac{2\pi}{N} n$$

into the continuous equations, the sampled data equations of motion become:

$$a(n) = a_0 \sin\left(\frac{2\pi}{N} n\right) \tag{5}$$

$$v(n) = \frac{a_0 N}{2\pi}\left(1 - \cos\left(\frac{2\pi}{N} n\right)\right) \tag{6}$$

$$x(n) = \frac{a_0 N}{2\pi}\left(n - \frac{N}{2\pi}\sin\left(\frac{2\pi}{N} n\right)\right) \tag{7}$$

where N is the number of samples required for one full sine wave of acceleration. Thus when n=N the sine wave is complete. Note that N is not required to be an integer. The x=axis in FIG. 1 is labeled in two ways. The sine cycle labels indicate the position along the sine wave in radians according to equation (3). The sample labels indicate position along the sine wave in terms of the sample number n as defined by equation (7) for a selected value of N=1000 samples to complete one sine cycle. The value of n depends upon the ability of the controller hardware to complete one controller cycle of receiving and interpreting data, computing and dispatching feedforward parameters. The value of N in turn depends not only on that of n but also upon the seek length, that is the distance in sample units that the head must travel from its starting position to its target position.

Substituting n=N into equation (7) and solving for N one obtains:

$$N = \sqrt{2\pi \frac{x(N)}{a_0}} \tag{8}$$

Thus a seek of length x(N) tracks requires N samples for completion and corresponds to a seek time. For short seeks a corresponding low value of N may not be practical and can cause instabilities in the seek. It is therefore necessary to define an $N_{min}$. Then, for short seeks (N<$N_{min}$), the value of $a_0$ is changed and a new N is computed.

By inspection of equation (6), maximum velocity occurs at n=0.5*N (or cos θ=−1). Substituting N from the seek time equation, one obtains:

$$v_{max} = \frac{a_0 N}{\pi} = \sqrt{\frac{2}{\pi} a_0 x(N)} \tag{9}$$

In order to limit the acceleration so that a maximum velocity $v_{(NE)}$ is not exceeded, one substitutes N from the seek time equation (8) into the maximum velocity equation (9) and solves for peak acceleration to obtain:

$$a_0 = \frac{\pi}{2} \frac{v_{max}^2}{x(N)} \tag{10}$$

Determination of coast is not necessary if the drive never reaches coast velocity. This is a property of the drive design considered here. A different drive could easily necessitate a coast state. It would be straightforward for a person skilled in the art to add a coast state to the present sine seek procedure.

Exponential Arrival

Referring back to in FIG. 3, it can be seen that the velocity trajectory of the sine seek curve becomes very steep near the target position. In fact, the slope is vertical at the target position. This means that the incremental gain of v(x) in the block diagram (FIG. 12) grows without limit. Left unchecked, this will cause the outer position loop to become unstable at or near the target position. This problem is overcome by switching the travel mode of the read/write head from a sine path to an exponential path at an appropriate time. At the switch point, which is preferably near the target track of the read/write head, the feedforward instructions begin exponentially decreasing the acceleration, approaching zero when the target track is reached. The preferred exponential arrival time response for this embodiment may be represented by the equation:

$$x = x_i e^{-t/\tau} \tag{11}$$

where $x_i$ is the head position at the switch point and $\tau$ is the exponential time constant Differentiating equation (11) yields the velocity v.

$$v = -\frac{x_i}{\tau} e^{-t/\tau} \tag{12}$$

Substituting x into (12) gives $$v_{ExpTraj} = -\frac{x}{\tau} \tag{13}$$

where $v_{Exp\ Traj}$ is the velocity trajectory during exponential arrival (box 121 of FIG. 12). Care must be taken with the sign in the exponential velocity trajectory equation. When x=PES we obtain.

$$v_{ExpTraj} = \frac{PES}{\tau} \tag{14}$$

Now, differentiating velocity to get acceleration.

$$a = \frac{x_i}{\tau^2} e^{-t/\tau} \quad (15)$$

and substituting v into α one obtains:

$$a_{FF} = -\frac{v_{ExpTraj}}{\tau} \quad (16)$$

This is the acceleration feedforward needed to drive the PES to zero. A possible variation here is to exchange the estimated velocity for the trajectory velocity. The idea is that the acceleration feedforward $\alpha_{FF}$ drives the head velocity to zero and the exponential velocity trajectory drives the PES to zero while the velocity minor loop balances these two efforts. This is most useful when the exponential arrival initial conditions are not favorable (e.g. $v_i \neq x_i/\text{tau}$). Matlab® simulations validate this idea.

$$a_{FF} = -\frac{v_{Est}}{\tau} \quad (17)$$

$v_{Est}$ is an estimated velocity which is calculated from the measured position of the head and the corresponding actuator current, which is proportional to acceleration. These are instantaneously available parameters during the seek. The actuator current is proportional to the acceleration. Box 126 of FIG. 12 is an estimator which makes this calculation. An estimator is a standard item found in control systems and in disk drive servos. The acceleration feedforward is then computed by dividing by τ (FIG. 12 box 124).

Equations (16) and (17) represent two different ways of computing an acceleration feedforward. Equation (16) uses the desired trajectory while equation (17) uses the measured velocity. If the seek is precisely on the desired trajectory, the responses to both feedforward equations are the same. If the seek is off the trajectory, equation (17) will be superior. It is very unlikely that a seek will be precisely on the desired trajectory.

Because there is no easily implementable closed-form solution for the velocity trajectory, a lookup table must be used to find the desired velocity as a function of position. This is denoted by box 120 In FIG. 12.

Calculation of the Sine Move to Exponential Arrival Switchpoint

The next objective is to provide a smooth transition from sine move to exponential arrival. This requires no discontinuities in the acceleration. However, the derivative of the acceleration is allowed to have a discontinuity.

One method of keeping the acceleration continuous during the transition is to force both the feedforward and the velocity error $v_{Err}$ to be continuous (see FIG. 12).

To force the feedforward to be continuous, the acceleration due to the sine wave trajectory must equal the acceleration due to the exponential arrival trajectory at the switch point.

The sine wave acceleration at the switchpoint (n=M) is straight forward. M is the sample where the switch from sine to exponential occurs. Substituting M into the sine move acceleration (5) yields:

$$a_{sine}(M) = a_0 \sin\left(2\pi \frac{M}{N}\right) \quad (18)$$

The exponential acceleration is a function of $v_{Est}$. Assuming a nominal system, $v_{Est}$ will be equal to $v_{(n)}$ in the equations of motion. Substituting $v_{(M)}$ into (17) gives:

$$a_{exp}(M) = -\frac{a_0 N}{2\pi\tau}\left(1 - \cos\left(2\pi \frac{M}{N}\right)\right) \quad (19)$$

Setting the α's equal and solving for τ yields:

$$\tau = -\frac{N\left(1 - \cos\left(2\pi \frac{M}{N}\right)\right)}{2\pi \sin\left(2\pi \frac{M}{N}\right)} \quad (20)$$

Equation (20) is the requirement for the feedforward to be continuous. Note that τ is independent of $\alpha_0$.

Figure 5:
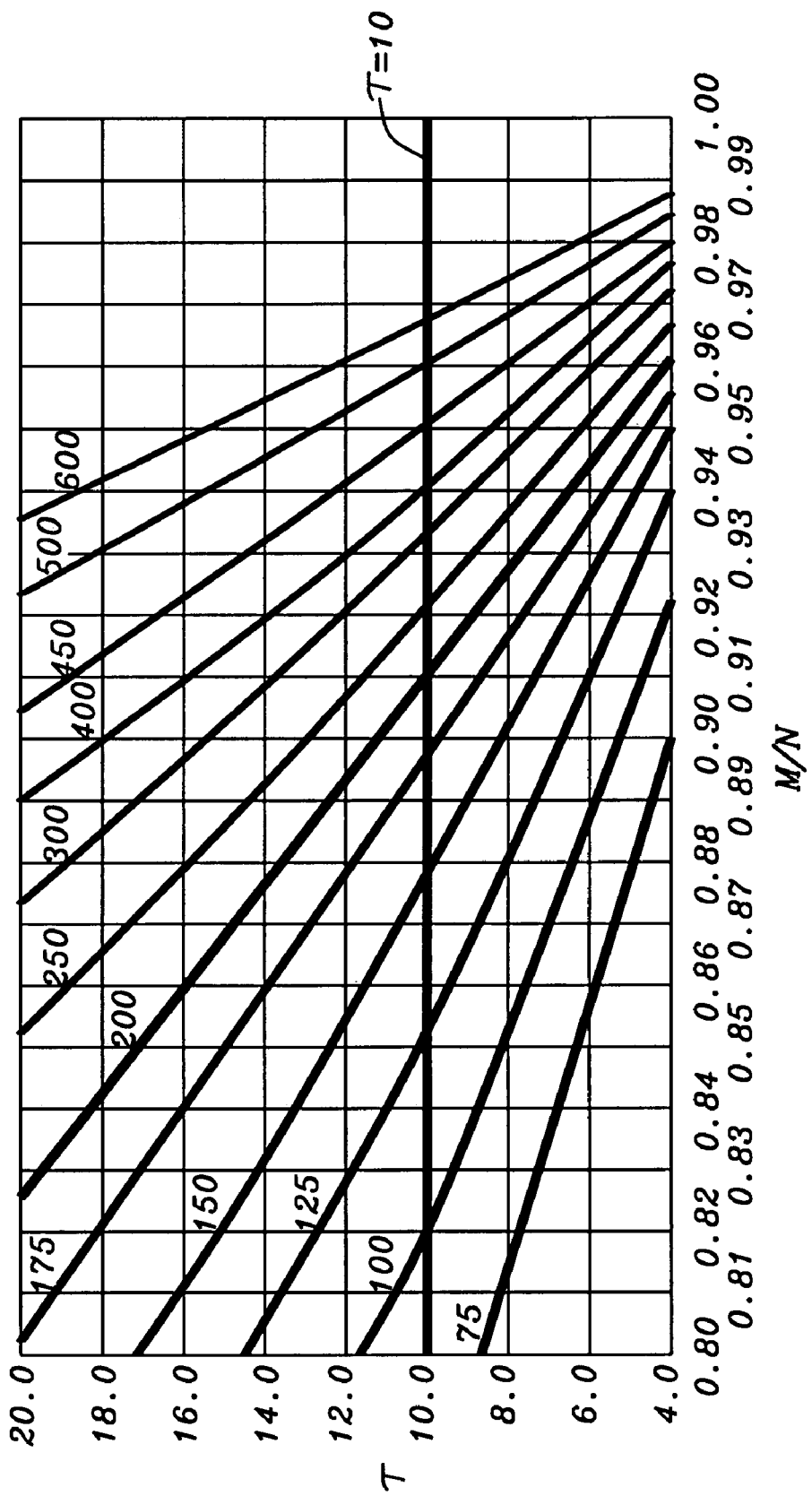
FIG. 5 is a graph showing the behavior of the exponential time constant $\tau$ as a function of the position of the sine-to-exponential transition in the sampling sequence of this invention for various values of the total number of samplings.
Figure 6:
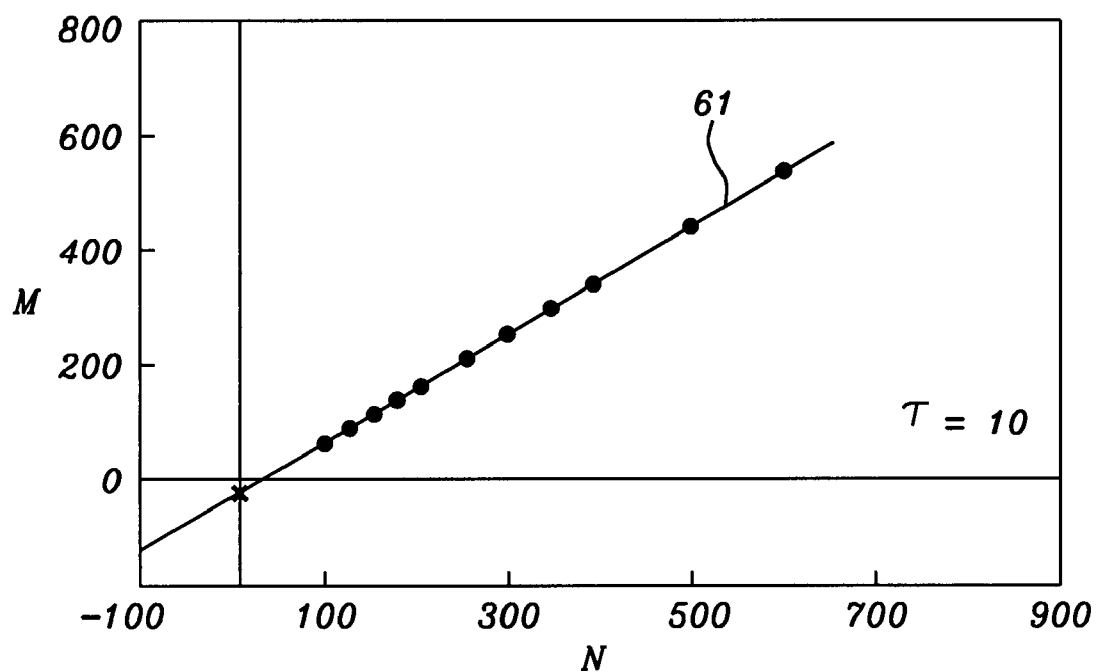
FIG. 6 is a plot of the position of the sine-to-exponential transition point M as a function of the total number of samplings N for the seek procedure taught in this invention and a $\tau$ of 10.

FIG. 5 shows a family of curves plotting τ as a function of M/N for several values of N. The values of N are denoted in the figure alongside each curve. A value of τ is selected and the values of M/N for the for each N value at the selected τ are collected. Table I lists these values for a value of τ=10. From each of these, a value of M is calculated. These values of M are then plotted against N as illustrated in FIG. 6.

The data is fitted to a straight line and the intercept at N=0 yields the desired value of M for the data shown in FIG. 5 for τ=10. The slope of the line is essentially 1 and the fitted intercept occurs at M=−18. The fitted values of M are also listed in Table I. Thus M=N−18. This means that, regardless of $\alpha_0$ or seek length, and for a τ of 10, switching the acceleration feedforward 18 samples before sine move completion produces a continuous feedforward. For τ≠10, the process must be repeated and a new switch point computed.

TABLE I

Values of MIN for various values of N at τ = 10 (from FIG. 5).

| N | MIN | $M_{(calc)}$ | $M_{(fitted)}$[1] | $M_{(fitted)}/N$ | $X_{(adjust)}$[2] |
|---|---|---|---|---|---|
| −100 | — | — | −118.19 | — | — |
| 0 | — | — | −18.47 | — | — |
| 75 | — | — | 56.31 | — | — |
| 100 | 0.820 | 82.00 | 81.24 | 0.812 | 34.00 |
| 125 | 0.853 | 106.63 | 106.17 | 0.849 | 29.50 |
| 150 | 0.874 | 131.10 | 131.10 | 0.874 | 25.00 |
| 175 | 0.890 | 155.75 | 156.03 | 0.892 | 22.50 |
| 200 | 0.903 | 180.60 | 180.96 | 0.905 | 20.00 |
| 250 | 0.922 | 230.50 | 230.82 | 0.923 | 16.00 |
| 300 | 0.934 | 280.20 | 280.68 | 0.936 | 14.00 |
| 350 | 0.944 | 330.40 | 330.54 | 0.944 | 12.00 |
| 400 | 0.950 | 380.00 | 380.39 | 0.951 | 10.00 |
| 500 | 0.961 | 480.50 | 480.11 | 0.960 | 8.50 |
| 600 | 0.967 | 580.20 | 579.83 | 0.966 | 7.50 |

Figure 7:
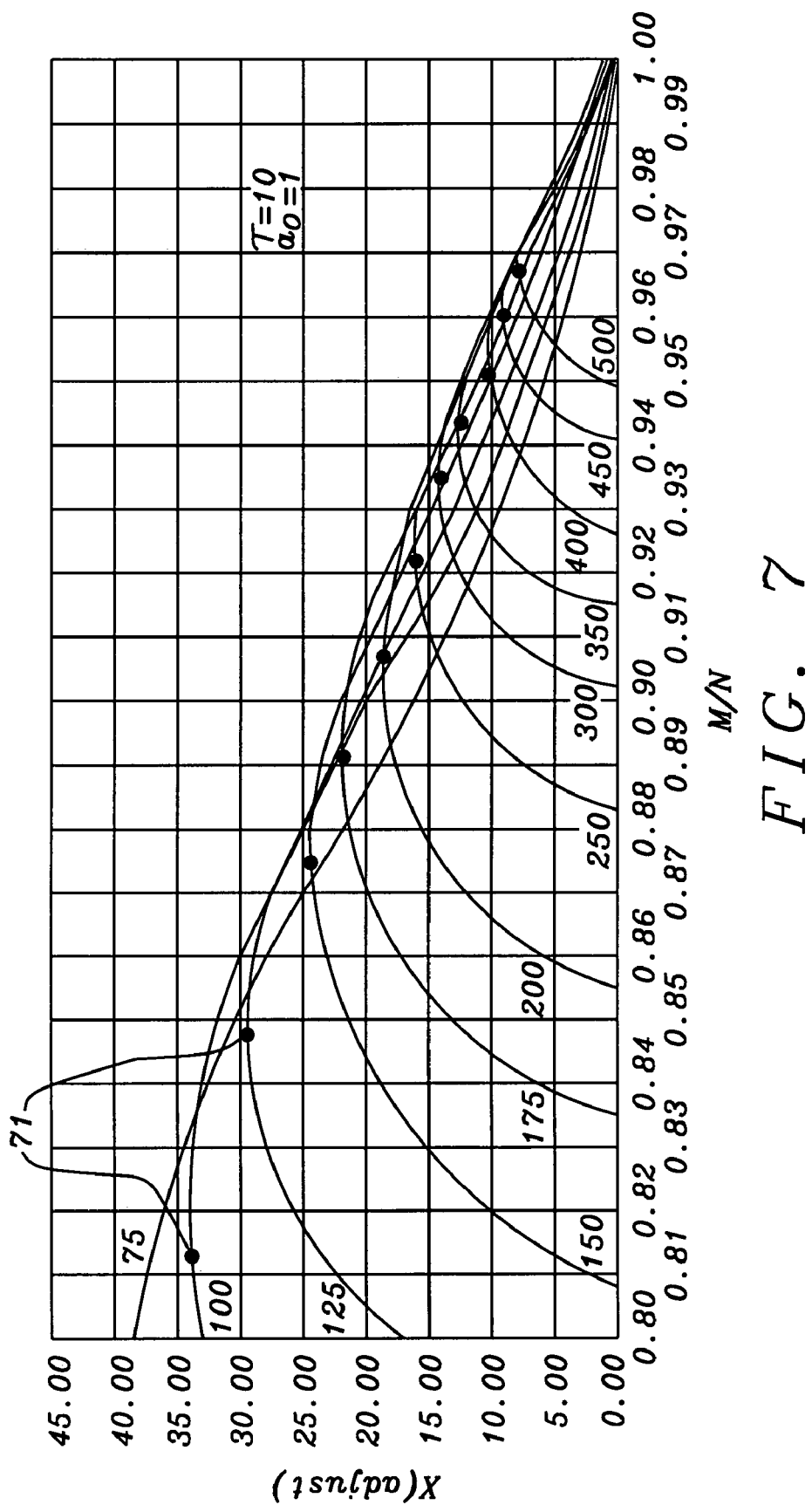
FIG. 7 is a plot of a family of curves of the calculated offset $x_{adjust}$ to the PES as a function of M/N for various values of N and a $\tau$ of 10.

[1] Linear least squares fit of $M_{(calc)}$.
[2] Data from FIG. 7.

To force the velocity error to be continuous, $v_{(x)}$ must equal $x_{tgt}/\tau$ at the switch point. Assuming a nominal system, $v_{est}$ will be equal to $v_{(n)}$ in the equations of motion. This implies that:

$$\frac{PES_{(M)}}{\tau} = v_{(M)} \quad (21)$$

This equation has little chance of ever being valid exactly. Therefore we add an offset to PES, viz.

$$\frac{PES_{(M)} - x_{adjust}}{\tau} = v_{(M)} \quad (22)$$

Solve for $x_{adjust}$ $$x_{adjust} = PES_{(M)} - \tau v_{(M)} \quad (23)$$

Substitute from the equations of motion (note: $PES_{(M)} = x_{(N)} - x_{(M)}$).

$$x_{adjust} = x_{(N)} - \frac{a_0 N}{2\pi}\left(M - \frac{N}{2\pi}\sin\left(2\pi\frac{M}{N}\right)\right) - \tau\frac{a_0 N}{2\pi}\left(1 - \cos\left(2\pi\frac{M}{N}\right)\right) \quad (24)$$

Finally rearranging and taking $X_{(N)}$ from the seek time equation (7), we get:

$$x_{adjust} = \frac{a_0 N}{2\pi}\left(N - M + \frac{N}{2\pi}\sin\left(2\pi\frac{M}{N}\right) - \tau + \tau\cos\left(2\pi\frac{M}{N}\right)\right) \quad (25)$$

Equation (25) defines $x_{adjust}$ in a way that the velocity error is continuous at the sine to exponential switch point.

Referring to FIG. 7 there is shown a plot of $x_{adjust}$ vs. M/N for various values of N and for $\tau=10$ and $\alpha_0=1$. Using the M/N,N data previously collected, the $x_{adjust}$, N data are collected from FIG. 7. The values of $M_{(fitted)}/N$ are read from Table I and the corresponding values of $x_{adjust}$ in FIG. 7 are collected. These values are marked by a point 71 on each curve in the figure and are listed in Table I. Note that, in this case, the $x_{adjust}$ values are favorably located (where the curves are 'flat').

Figure 8:
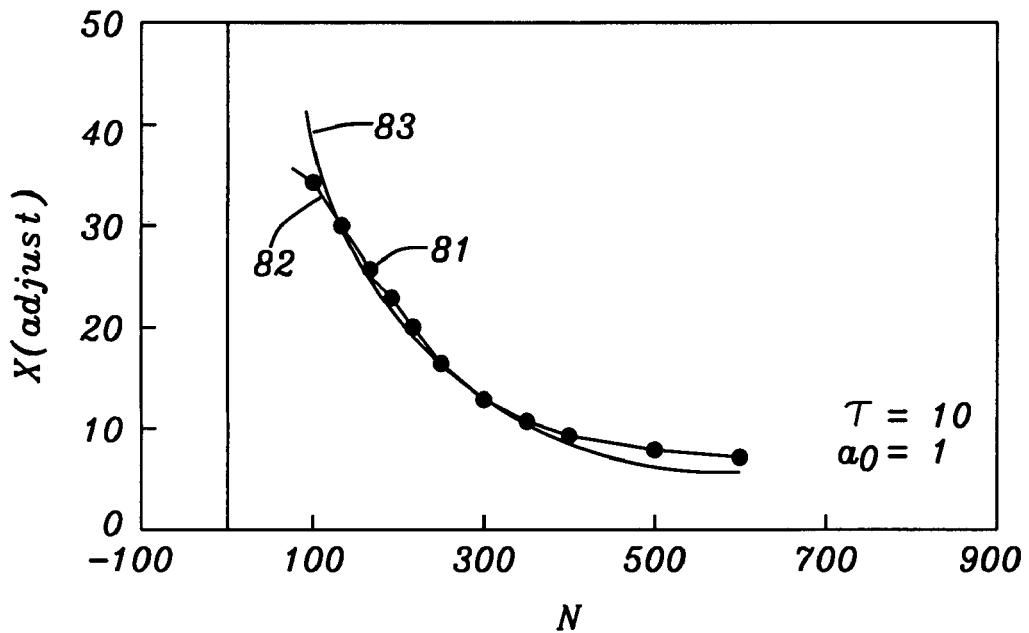
FIG. 8 is plot of the calculated offset $x_{(adjust)}$ as a function of the total number of samplings N, for a $\tau$ of 10.

Plotting $x_{adjust}$ vs. N produces the curve shown in FIG. 8. The dots 81 are the $x_{adjust}$, N data points, the line 82 is a curve fit to the data using the power expression:

$$x_{adjust} = 2337 N^{-0.906}. \quad (26)$$

Line 83 is $X_{adjust} = 4000/N$. 4000 was chosen because for large N, $x_{adjust}$ is increased by $\alpha_0$ and for small N, $x_{adjust}$ is decreased by $\alpha_0$. These $x_{adjust}$ values are for $\alpha_0=1$ and $\tau=10$. For $\alpha_0 \neq 1$, the $x_{adjust}$ value must be multiplied by $\alpha_0$.

$$x_{adjust} = a_0\left(\frac{4000}{N}\right) \quad (27)$$

For $\tau \neq 10$, the process must be repeated.

Short Seek $\alpha_0$ Reduction

One of the first steps of the each seek operation is the determination of the seek length x(N), the distance in terms of the number of tracks from the seek start to the target track. For short seeks, it is likely that N would be too small to permit a reasonable value for M, that is, it would set the switchpoint too far back into the sine wave. To overcome this problem a minimum value $N_{min}$ is defined as an empirical constant stored in memory. Then the value of $\alpha_0$ is then adjusted to permit a reasonable switchpoint. Whereas in the previous derivation the switchpoint was determined as 18 from the calculated intercept of the M vs. N curve (FIG. 6) which had a $\alpha_0$ of 1, for the short seek we set $N=N_{min}$ and determine a new $\alpha_0$ by allowing the intercept to become a variable s.

$$M = N - s \quad (28)$$

A second equation (29) is then defined to set the switchpoint at a convenient fraction $k_s$ of the sine wave.

$$M = k_s N \quad (29)$$

Combining equations (28) and (29) and recognizing that $k_s$ sets a minimum value for N yields:

$$N_{min} = \frac{s}{1 - k_s} \quad (30)$$

This means that seeks faster than $N_{min}$ samples must have a smaller $\alpha_0$ (Reducing $\alpha_0$ increases N).

Substituting $N_{min}$ for N in the seek time equation and solving for $\alpha_0$ yields $$a_0 = 2\pi \frac{x(N)}{N_{min}^2} \quad (31)$$

For seeks not meeting $N_{min}$ this lowers $\alpha_0$ such that all seeks of less than $x(N_{min})$ tracks have the same M and they will all take the same amount of time during the sine move. However, the time during the exponential arrival will not be constant because a shorter seek will have a smaller position (and velocity) initial condition and will therefore transition to the target track sooner. The seek time vs. the seek length will monotonically increase.

Switching from Sine Move to Exponential Arrival for $\tau \neq 10$

Figure 9:
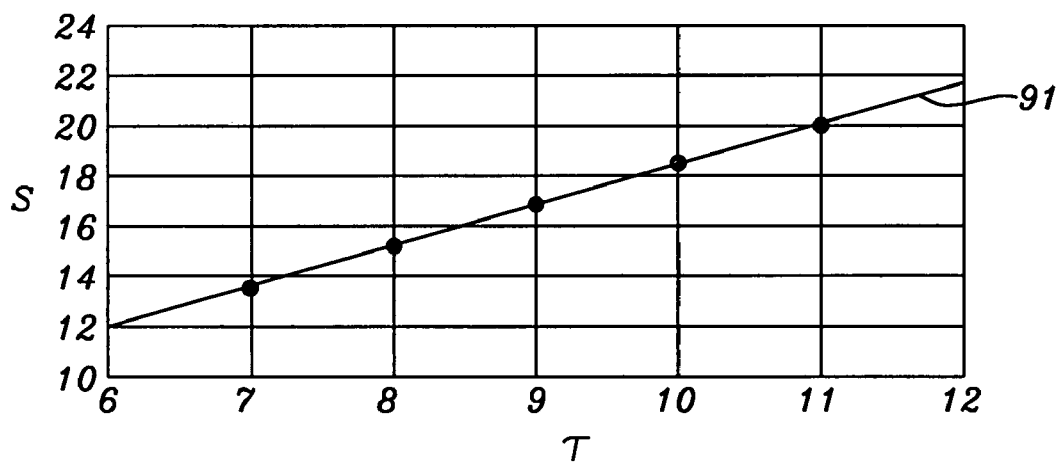
FIG. 9 is a plot of the sine-to-exponential transition point variable s the as a function of the time constant $\tau$ for the seek procedure of this invention.

In the section describing the calculation of the sine move to exponential arrival supra, $\tau$ is set to 10. The technique for obtaining M & $x_{adjust}$ are repeated for a range of $\tau$'s. FIG. 9 shows the results of these calculations for several values of $\tau$ with the new variable s replacing M.

Figure 4:
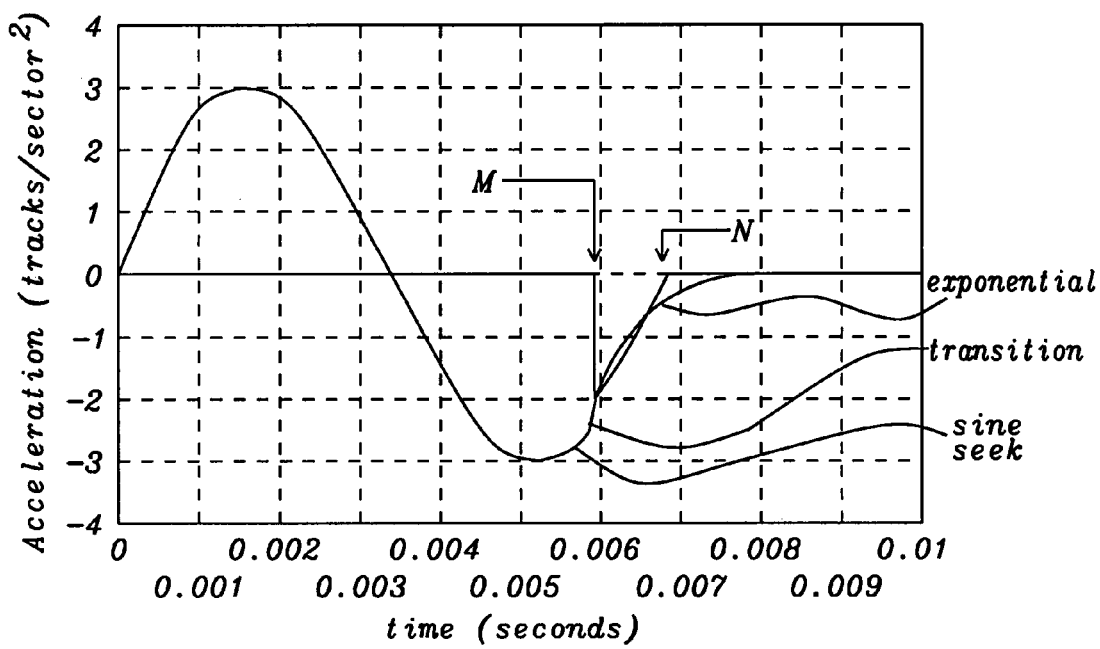
FIG. 4 is a plot illustrating the path of the acceleration feedforward of the sine/exponential seek procedure of this invention.

The data was extracted from that displayed in FIG. 4 in the same manner as the data for FIG. 6. The linear least squares fit of the data, shown by line 91 in FIG. 9 provides the equation (32) for s for various values of $\tau$.

$$S = 1.6\tau + 2.3 \quad (32)$$

Equation (32) should be used when setting up the seek constants for a given $\tau$.

Figure 10:
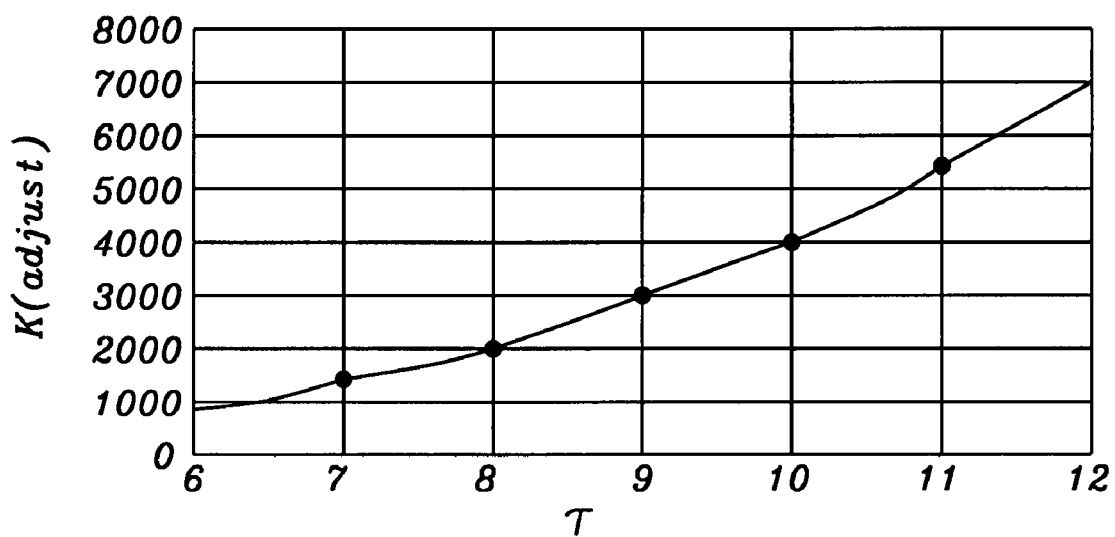
FIG. 10 is a plot of the calculated offset $K_{(adjust)}$ as a function of $\tau$ for the seek procedure of this invention.

FIG. 10 shows the relationship between $x_{adjust}$ and $\tau$ where $x_{adjust} = \alpha_0 K_{adjust}/N$. The value 4000 in equation (27) is now replaced by a new constant $K_{adjust}$ which is computed from the data in FIG. 8 collected for various values of $\tau$ The curve fit yields equation (33) for $K_{adjust}$ as a function of $\tau$.

$$K_{adjust} = 4.37 \times \tau^{2.97} \quad (33)$$

As in the case of equation (32) equation (33) should be used when setting up the seek constants for a given $\tau$.

Two things are sufficient to keep the acceleration continuous when switching from sine move to exponential arrival: 1) the feedforward must be continuous and 2) the velocity error must be continuous. Equations (32) and M=N−S keep the feedforward continuous. Equation (33) and the expression $X_{adjust} = \alpha_0 \, K_{adjust}/N$ keep the velocity error continuous. Equation (32) has no part in $K_{adjust}$.

Seek Procedure Summary, Step by Step

The following sequence of steps is followed by the disk seek controller to implement the procedure of the present invention. References are made to steps on the flow chart in FIG. 11 as well as to features in the block diagram in FIG. 12:

1. Get Seek Length, $X_{(N)}$ and Calculate Seek Time, N(111).

The disk controller receives the address of the target track from the microprocessor or host interface, directs the transducer to read its current position, and then computes the number of samples N required to reposition the transducer from the current track to the target track.

2. Test for Short Seeks (FIG. 11-112).

If N<Nmin, reduce $\alpha_0$ with equation (31) and calculate a new N with equation (8) (FIG. 11-112a).

3. Compute $v_{(max)}$ ((FIG. 11-113) Equation (9) and Test Against $v_{(NE)}$ (FIG. 11-114) for Long Seeks.

a) If $v_{(max)} > v_{(NE)}$, compute $\alpha_0$ with equation (10), set $v_{(max)} = v_{(NE)}$, and compute a new N from equation (8) (FIG. 11-114a).

4. Calculate Sine-to-Exponential Switch Point, M (Equations (32) and (28)) (FIG. 11-115).

5. Calculate $X_{(adjust)}$ (eqn 33 and $X_{adjust} = \alpha_0 K_{adjust}/N$) and a new N=

$$N_{(adjust)} = \sqrt{2\pi \frac{(x_{(N)} - x_{(adjust)})}{a_0}} \quad \text{(Equation (8), FIG. 11-116)}$$

6. Start Seek (FIG. 11-117).

a.) turn on sine feedforward using new N from step 5 (FIG. 11-117 and FIG. 12—switches 122 and 125 set to move).

b.) obtain velocity trajectory from normalized table v(x) (FIG. 12-120).

i) scale up position by total seek length and scale up velocity by $v_{(max)}$.

ii) look up velocity for distance=$X_{(N)} - X_{(adjust)}$

7. At Sample M Switch to Exp Arrival.

a. Switch to exponential feedforward (−v(est)/τ) (FIG. 12 switch 125)

b. Switch to exponential velocity (PES/τ) (FIG. 12 switch 122)

i) seek as if distance=X(N).

8. Wait Until Done and Switch to Track Follow.

In step 1, the seek length is determined from the initial position of the read/write head and the position of the target track. The former is obtained by query of the servo controller, the later by request from the disk controller. From this the value of N (step 2) is easily determined from $\alpha_0$ In step 3, $v_{(max)}$ is tested against a velocity which is not to be exceeded. $v_{(NE)}$, This value is a constant of the disk drive.

τ, the exponential time constant, is chosen by the designer. Too large a value will make the overall seek time become too large. Too small a value will not allow the system sufficient time to reduce any errors before arriving at the target location.

In the FIG. 12 boxes 121 and 124 are multipliers. The output of each box is the input times whatever's in the box. PES is the input to 121. The multiplier in box 121 is 1/τ. Consequently 121's output is PES/τ. The input to box 124 is v(est) and the output is −v(est)/τ. These procedures are standard and well known to those skilled in the field of servo control systems.

In FIG. 12, boxes 127, 128, and 129, labeled Kloop, Kdac, and Kact/s² respectively are relatively common in servo systems.

Kact is the actuator gain (or plant gain). The units here are tracks/sample²/mA. Depending on the situation, it is sometimes necessary to include the dynamic characteristics of the actuator in the model. In that case, this block is a transfer function. Fortunately, we can use a simple gain term and 1/s².

Kdac is the digital to analog converter gain in mA/bit.

Kloop is the gain term used by the drive servo code to set the bandwidth of the velocity minor loop. The velocity minor loop is the path in FIG. 12 through the Est, Kloop, Kdac, Kact & back to the Est block. The minor loop bandwidth is roughly 500 Hz.

Calibrations of the Disk Drive

The calibrations necessary for the Implementation of the quiet seek procedure are described as follows:

(I) One Time Calibrations:

The composite gain Kact* Kdac (referred to within the firmware as "acceleration gain") is calibrated on a one time basis after the drive is assembled in the factory. This calibration factor (with units of tracks/sample²/bit) is used in three ways in the quiet seek procedure. They are:

1) To generate the DAC command corresponding to the acceleration feedforward component used during the sine portion of the seek.

2) To generate the DAC command corresponding to the acceleration feedforward component used during the exponential arrival portion of the seek.

3) To "calibrate" the velocity estimator response based on the measured response characteristics of the drive.

(II) Boot Up Calibrations: None (III) Adaptive Calibrations

Adaptive calibrations are continuously ongoing with each seek performed. Even when all system parameters aren't precisely known, the quiet seek will eventually converge to the target track with the acceleration, velocity, & position being driven to zero at the target track. This is particularly dictated by the phase plane (time independent) method of generating the acceleration feedforward term during exponential arrival. As our knowledge of the system parameters deviates from the ideal, the seeks will generally take longer to complete as the controller (with finite gain) compensates for the slight overshoot or undershoot incurred. In an effort to maintain predictable and repeatable seek times, the velocity error at the sine to exponential switch point is slowly driven to near zero in the controller firmware by a scheme that adaptively adjusts the acceleration gain to achieve this. This puts the actuator precisely on the exponential arrival trajectory as the target track is approached, minimizing errors that add variability in the total seek time.

Matlab® is used to model the drive and simulate the seek system. Matlab® simulations are incorporated as look-up tables.

Matlab® participates in the seek directly in two ways:

1) It is used to generate a "folded over" normalized velocity trajectory table which is incorporated in the controller firmware. This is a look-up table of normalized velocity vs. normalized position used by the seek controller during the sine move to determine the desired velocity at any given position.

The velocity reference for the sinusoidal portion of the quiet seek is generated using a table contained in firmware. Since the velocity profile for the seek is symmetric about the seek midpoint, the table need only represent the trajectory for the first half of the seek. For the second half of the seek, the table is "folded over" and traversed in the reverse direction until the switch-point for the exponential arrival is reached.

In order that a single trajectory table can be utilized for all seek lengths which necessarily have different maximum velocities, the table seek length and velocity parameters are both normalized to 1. To conserve memory yet provide good accuracy at the end of the seek where precise velocity control is necessary, the table has zones of varying resolution. The highest resolution zone is at the beginning of the table (used at the beginning and end of the seek when velocities are lowest), with zones of decreasing resolution as the table is traversed to the end (used in the highest velocity mid-part of the seek).

The normalized velocity trajectory table is used to generate a velocity demand at any given position in a phase-plane approach. This normalized table is independent of actual acceleration as well as all system-specific parameters making it reusable across all platforms and systems. The table features multiple "zones" with varying resolution, insuring accurate trajectories at low velocities when transitioning to exponential arrival.

2) It is used to generate a look-up table incorporated in the controller firmware which is used to:

a) determine the number of samples N required for any length seek as described by equation (8)

b) determine the actual peak acceleration $\alpha_0$ for any length seek as described by equation (10) and c) determine a highly precise increment used to step through the firmware sine table to generate an accurate acceleration feedforward current during the sine move.

Results

Figure 13:
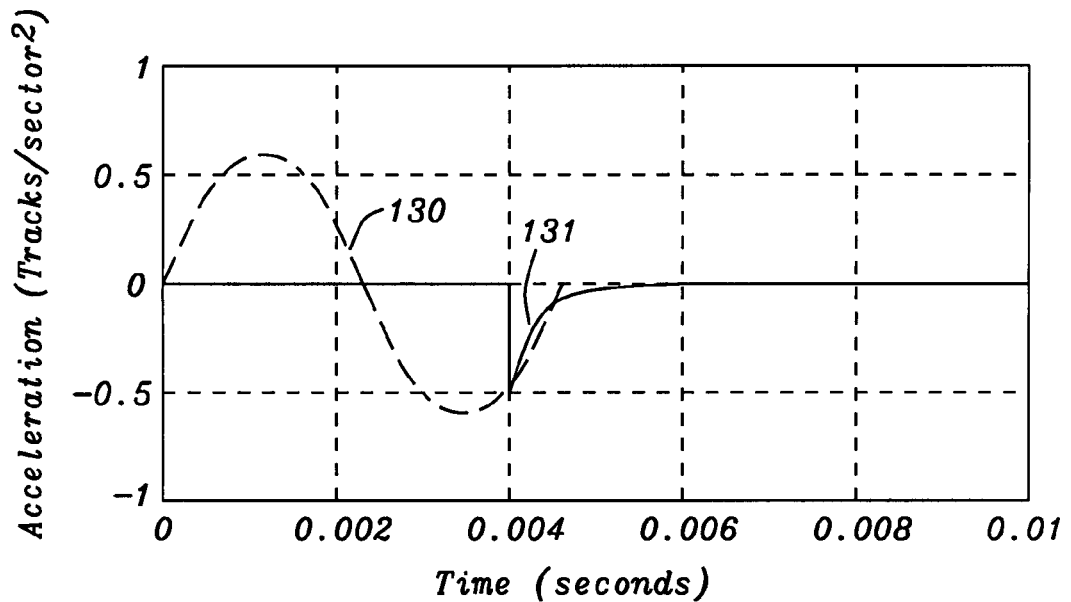
FIG. 13 is a plot of a 1000 track seek showing the acceleration of the actuator head during the sine move with exponential arrival using the procedure taught by this invention.
Figure 14:
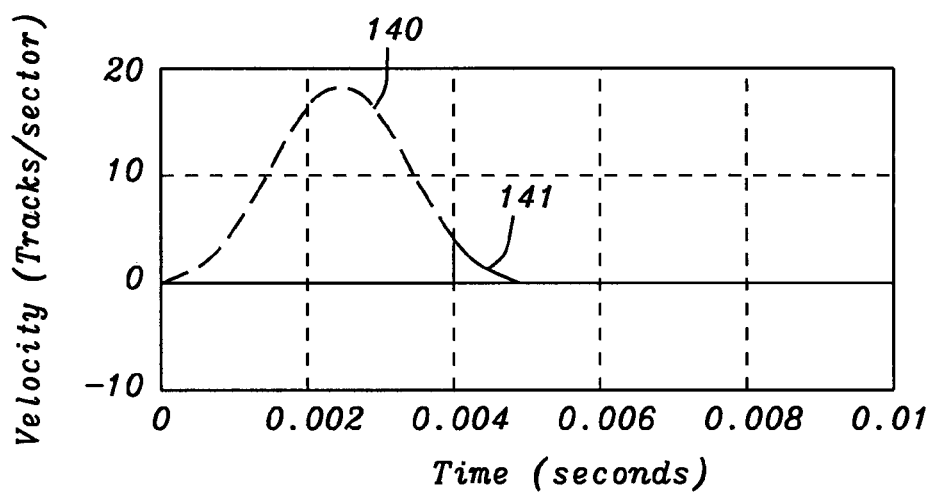
FIG. 14 is a plot of a 1000 track seek showing the velocity of the actuator head during sine move with exponential arrival using the procedure taught by this invention.

FIGS. 13 through 16 show the behavior of various parameters of the the sine/exponential seek process of the present invention as a function of time in seconds. FIG. 13 shows the acceleration sine curve 130 and the exponential curve 131, the transition taking place at about 0.004 seconds. FIG. 14 shows the corresponding sine 140 and exponential 141 velocity.

Figure 15:
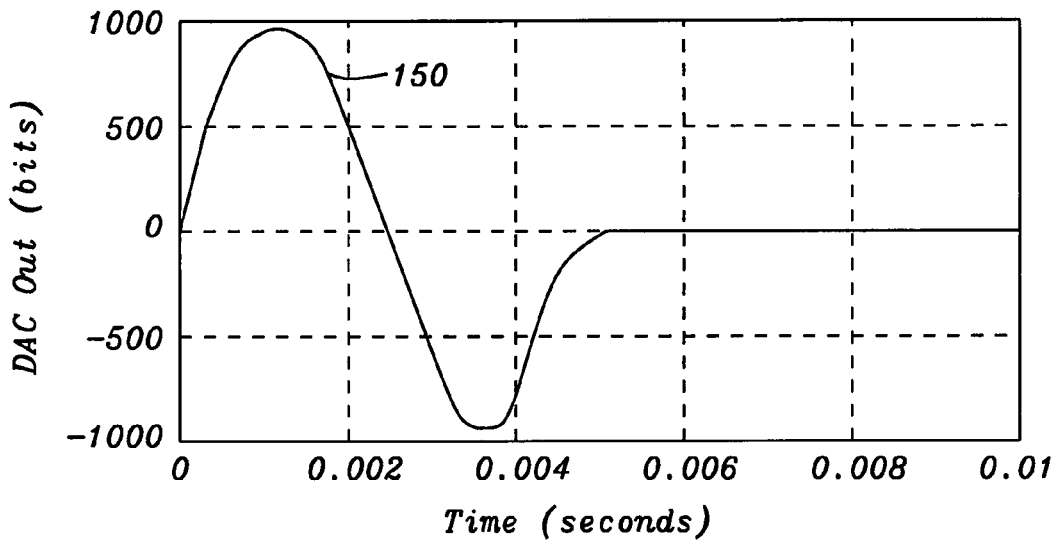
FIG. 15 is a plot of the is a plot of a 1000 track seek showing the DAC output during sine move with exponential arrival using the procedure taught by this invention.
Figure 16:
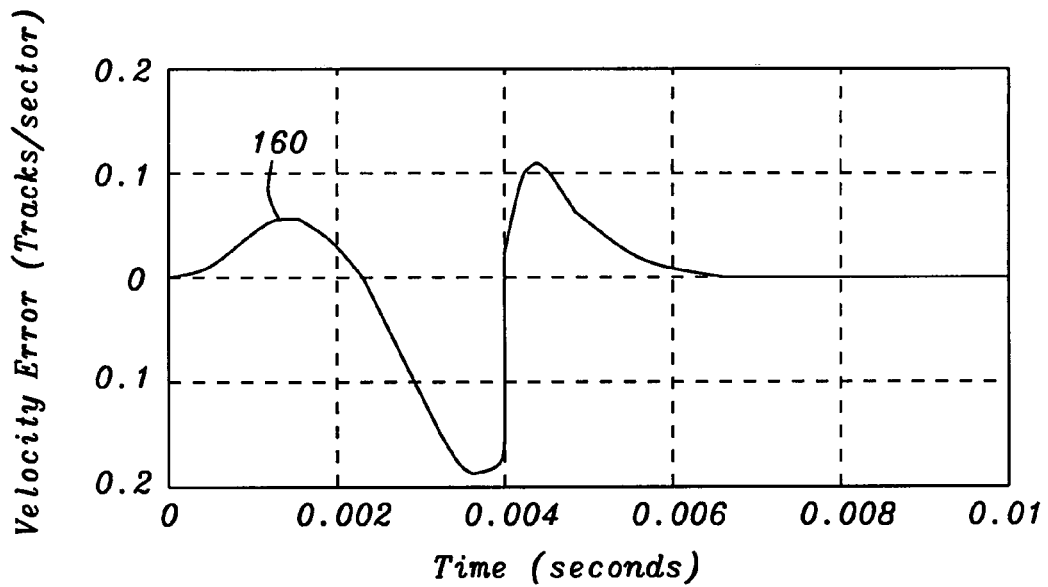
FIG. 16 is a plot of the is a plot of a 1000 track seek showing the velocity error of the actuator head during sine move with exponential arrival using the procedure taught by this invention.

FIG. 15 shows the behavior of the DAC output command 150 as a function of time and FIG. 16 shows the behavior of the velocity error 160.

Figure 17:
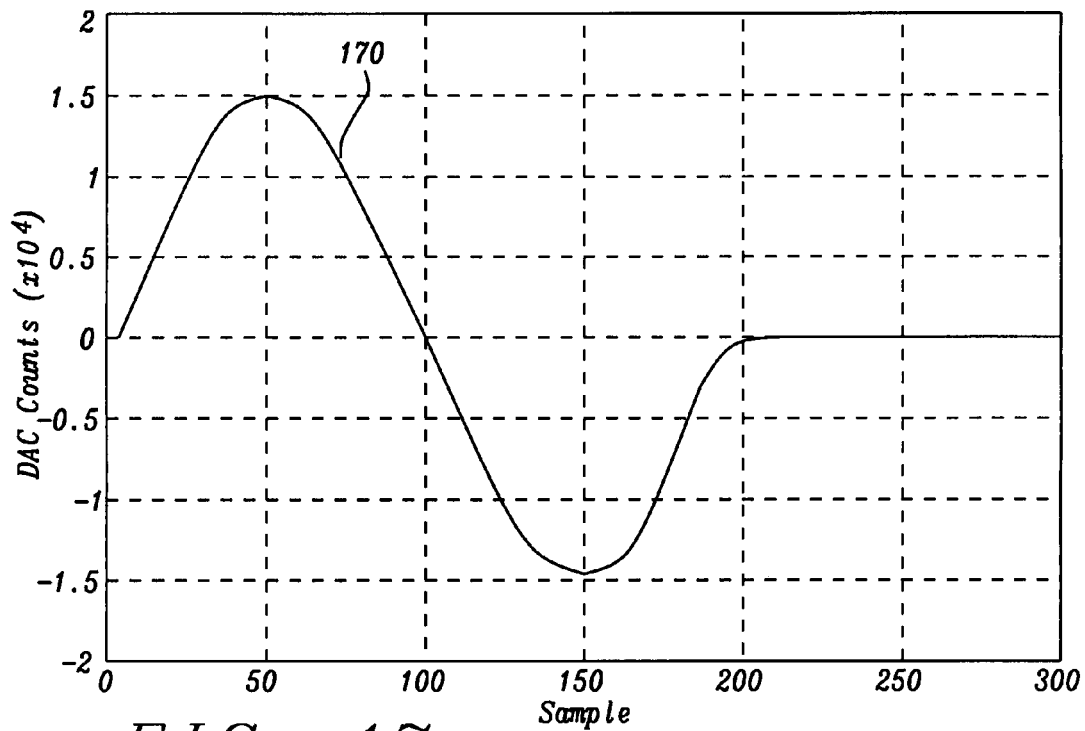
FIG. 17 is a plot of actual current command in DAC counts delivered to the head assembly as a function of the sample number.
Figure 18:
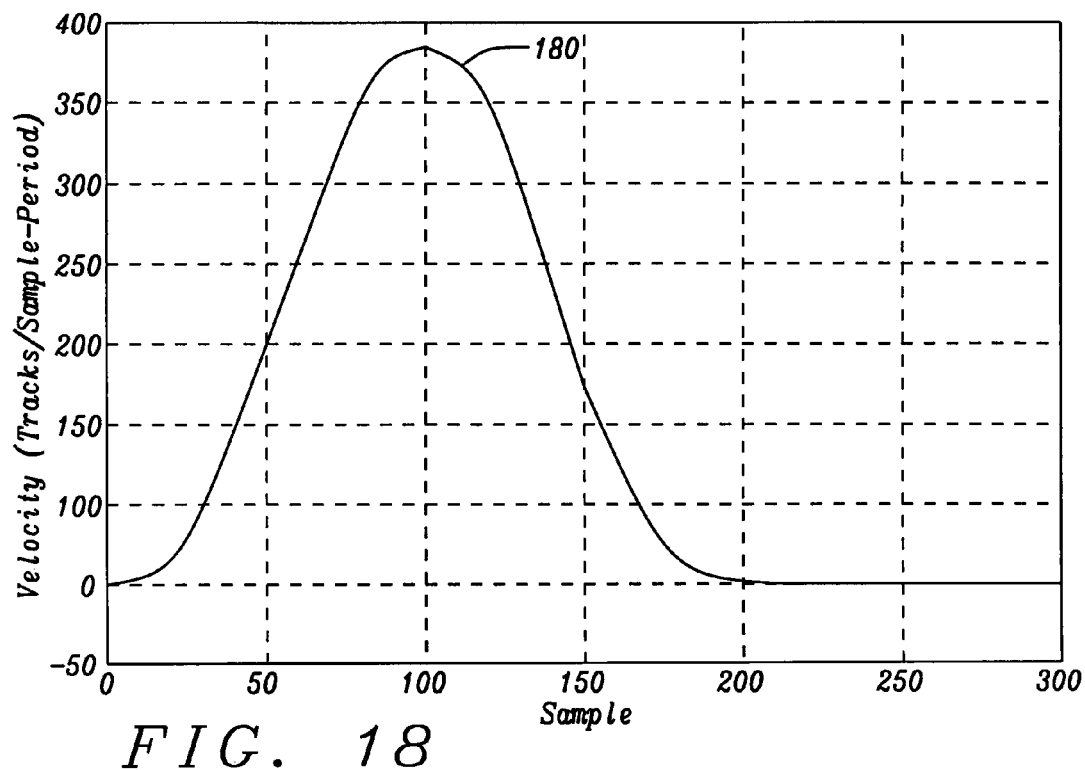
FIG. 18 is a plot of the actual and commanded velocities as a function of the sample number.
Figure 19:
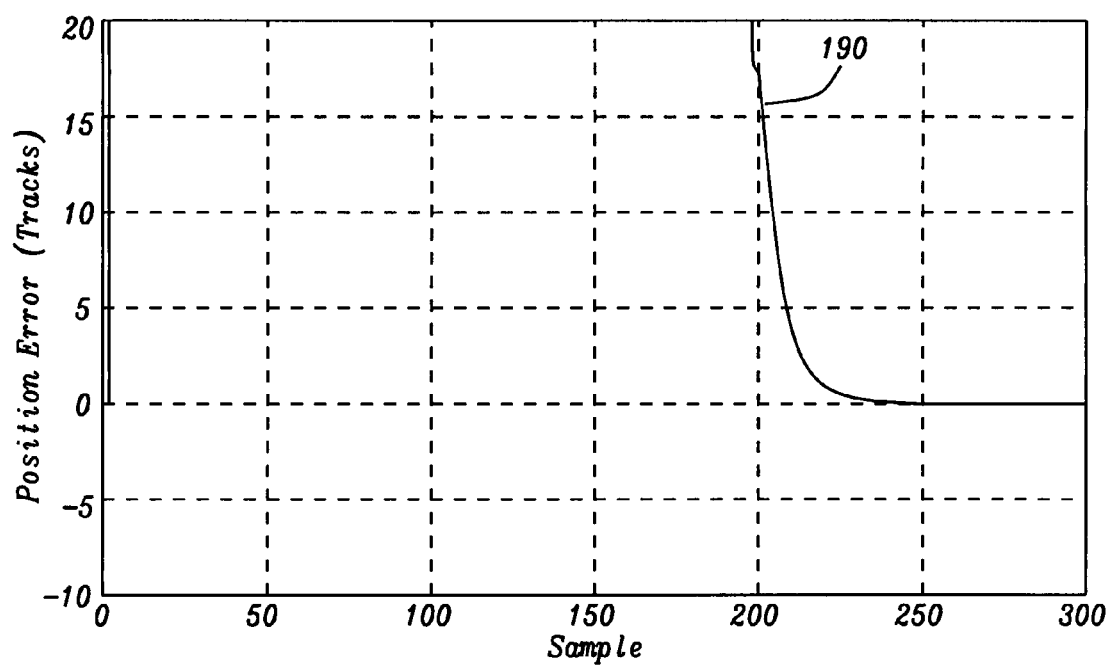
FIG. 19 is a plot of the position error of the head in tracks as a function of sample number.

FIGS. 17 through 19 show the progression of actual seeks as a function of sample count. In FIG. 17 the current commands 170 delivered to the actuator of a head assembly in terms of DAC counts is shown as a function of the sample period number. This corresponds to the acceleration feedforward. FIG. 18 shows the corresponding velocity 180 in terms of number of tracks-per-sample-period. In the curve of FIG. 18 the both the actual velocity and the commanded velocity are identical and fall on the same curve 180. The transition between the sine portion and the exponential arrival is so smooth and continuous that it cannot be casually discerned in either figure.

FIG. 19 shows the actual position error 190 driven smoothly to zero at the end of the seek. When the head reaches the target track at the end of the seek, a track following period occurs during which the desired read/write operation is performed. Then either a new seek is begun or the head may be returned to a designated parking zone, ready for the next seek.

While this invention has been particularly shown and described with reference to the preferred embodiments thereof, it will be understood by those skilled in the art that various changes in form and details may be made without departing from the spirit and scope of the invention.

What is claimed is:

1. A acceleration feedforward directed seek procedure for initiating and controlling the movement of an actuator controlled read/write head of a disk storage device from an initial position to a target position comprising:

(a) applying time based acceleration feedforward instructions to said actuator, progressively computed at each of a plurality of successive time intervals starting at zero and on a sinusoidal trajectory, increasing to a maximum, then decreasing, passing through a minimum, and then increasing to a switchpoint whereat the acceleration of the sinusoidal trajectory equals the acceleration of the exponential trajectory, thereby resulting in making a smooth and continuous transition to an exponentially decreasing trajectory;

(b) whereupon during said exponential trajectory, acceleration and velocity are each driven, by timely computed corrections to said feedforward, to reach zero when said head reaches said target position;

(c) wherein said acceleration feedforward instructions are progressively computed at each of a plurality of successive time intervals using calibration data comprising a normalized velocity trajectory look-up table incorporated in controller firmware and positional feedback data from said read/write head;

(d) wherein a folded-over normalized velocity trajectory table is provided to generate a velocity demand at any given head position in a phase-plane approach, said normalized velocity trajectory table being independent of actual acceleration as well as all system-specific parameters making it reusable across all platforms and systems, said table further featuring multiple zones with varying resolution, thereby insuring accurate trajectories at low velocities when transitioning to exponential arrival.

2. A method for initiating and controlling the movement of a read/write head of a disk storage device using a sine to exponential acceleration feedforward procedure comprising:

(a) providing a disk storage device having:

(i) at least one storage disk having a plurality of data tracks;

(ii) an actuator arm, movable by an actuator motor, with a read/write head attached thereto, said read/write head having access to said plurality of tracks;

(iii) a seek controller having means for controlling the movement of said read/write head over said at least one storage disk by operating said actuator motor; and (iv) a microprocessor interfacing with said seek controller;

(b) said seek controller obtaining an initial seek length;

(c) computing an initial seek time N, and if said initial seek time N is less than a minimum seek time $N_{min}$, adjusting a coefficient $a_0$ to bring said initial seek time N to equal or exceed $N_{min}$;

(d) computing a maximum velocity $v_{(max)}$ and if said $v_{(max)}$ exceeds a velocity not to be exceeded $v_{(NE)}$, adjust said coefficient $a_0$ to reduce said maximum velocity to equal or fall below $v_{(NE)}$;

(e) computing a sine-to-exponential switchpoint M;

(f) computing a position adjustment $x_{adjust}$ to assure a smooth and continuous sine-to-exponential transition;

(g) starting a sine seek by initiating a sine acceleration feedforward signal to said actuator motor; and (h) at said switchpoint, turning off said sine seek, and using said position adjustment $x_{adjust}$, initiating exponential acceleration feedforward signals to said actuator motor to seek completion.

3. The method of claim 2 wherein said initial seek length is the number of tracks that the read/write head must travel from an initial track to a target track wherein the former is obtained by request of the disk controller and the later by query of the servo controller.

4. The method of claim 2 wherein the seek time is expressed as the computed number of sampling cycles which are required for the seek controller to drive the read/write head over the seek length in one full sign wave of acceleration feedforward instructions to said actuator.

5. The method of claim 2 wherein said position adjustment $x_{adjust}$ is computed from the equation:

$$x_{adjust} = \frac{a_0 N}{2\pi}\left(N - M + \frac{N}{2\pi}\sin\left(2\pi\frac{M}{N}\right) - \tau + \tau\cos\left(2\pi\frac{M}{N}\right)\right)$$

where $\tau$ is a sample time constant of the exponential arrival having the units of sectors and is computed from the formula:

$$\tau = -\frac{N\left(1 - \cos\left(2\pi\frac{M}{N}\right)\right)}{2\pi\sin\left(2\pi\frac{M}{N}\right)}.$$

6. The method of claim 2 wherein a folded-over normalized velocity trajectory table is used to generate a velocity demand at any given head position in a phase-plane approach.

7. The method of claim 2 wherein said normalized velocity trajectory table is independent of actual acceleration as well as all system-specific parameters making it reusable across all platforms and systems.

8. The method of claim 7 wherein said table features multiple zones with varying resolution, thereby insuring accurate trajectories at low velocities when transitioning to exponential arrival.

9. The method of claim 2 wherein an acceleration gain which is used to generate said acceleration feedforward during said sine seek is continuously adapted to drive velocity error at said switchpoint to zero, thereby minimizing overall seek times and maximizing seek time repeatability.

* * * * *